March 12, 1946.  V. SORRENTINO  2,396,615
KEY HOLDER
Filed May 13, 1944
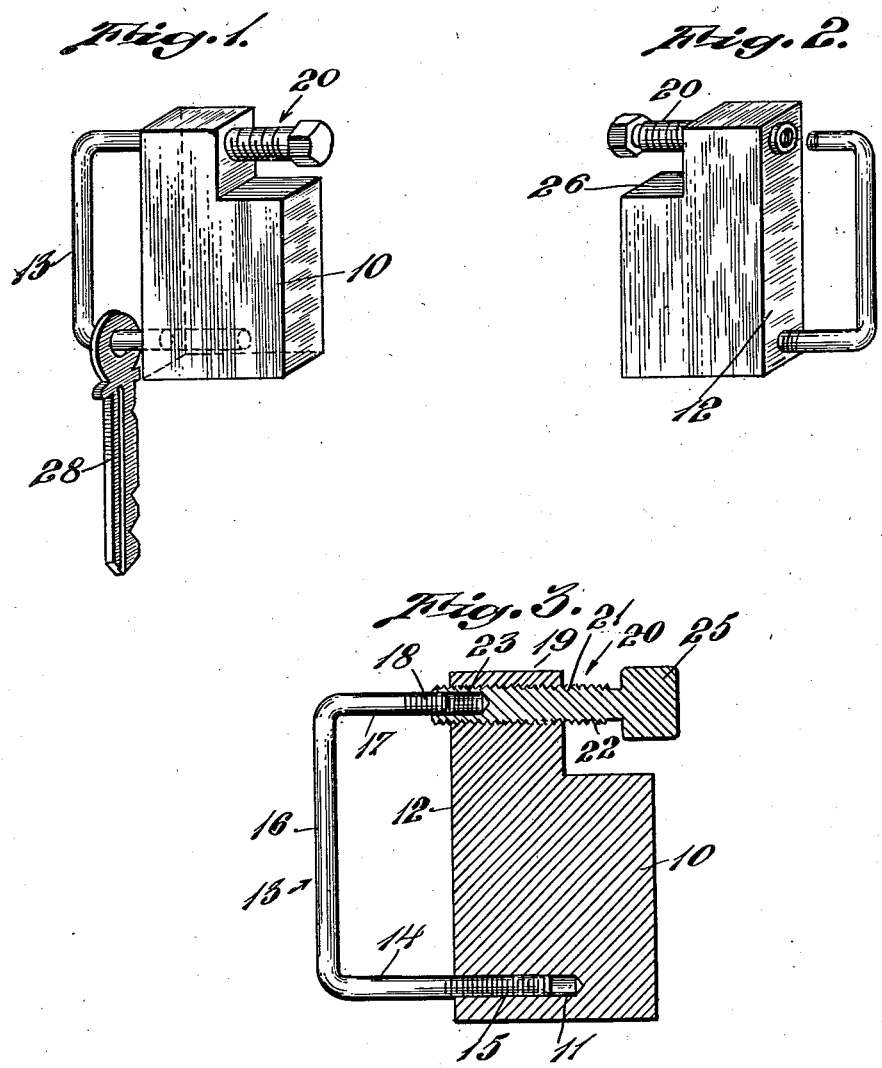
INVENTOR
Vincent Sorrentino
BY Barlow & Barlow
ATTORNEYS Patented Mar. 12, 1946

2,396,615

UNITED STATES PATENT OFFICE 2,396,615

KEY HOLDER

Vincent Sorrentino, Providence, R. I., assignor to Uncas Manufacturing Company, a corporation of Rhode Island Application May 13, 1944, Serial No. 535,434

2 Claims. (Cl. 70—456)

This invention relates to a key holder.

One of the objects of this invention is to provide a key holder which will be of simple construction and yet will hold a plurality of keys in assembled relation in a positive and secure manner.

Another object of the invention is to provide a construction which will be simple and easy of manipulation and yet will be such as to prevent accidental detachment of the parts.

Another object of the invention is to provide a device which will be thin and may lay flat in the pocket.

Another object of this invention is to provide a construction the parts of which may be made mechanically in multiple without special machinery and which parts may be quickly assembled in a simple manner.

A more specific object of the invention is to provide an arrangement which may be assembled and manipulated by simple threading and unthreading of various parts.

With these and other objects in view, the invention consists of certain novel features of construction, as will be more fully described and particularly pointed out in the appended claims.

In the accompanying drawing:

Fig. 1 is a perspective view of the key holder with a key mounted thereon;

Fig. 2 is a perspective view looking at the opposite edge of the key holder with the parts moved to a position for detaching the key;

Fig. 3 is a central sectional view through the body, hasp and locking member.

In proceeding with this invention I provide a block which has an opening in one edge for swingably mounting a U-shape hasp while there is an opening in another part of the block which will align with the other leg of the hasp and through which opening I provide a member for axial movement to engage and lock with the other leg so as to maintain a closed loop to retain such keys as may be mounted on the hasp in position.

With reference to the drawing 10 designates a block of material which may conveniently be plastic or any other light weight material. A recess or opening 11 is provided in the block 10 inwardly from the edge 12 thereof which recess is threaded. A hasp designated generally 13 is provided with a leg 14 which has threads 15 thereon to engage the threads of the recess 11 so that this leg 14 may be screwed into this recess as illustrated in Fig. 3. The relative sizes of the threaded recess and the leg 14 will be such that the leg may freely rotate in the recess to be swung from one position to another about the central axis of the leg 14.

The hasp 13 has a bridging part 16 extending from the leg 14 with a leg 17 at the other end which is also provided with threads 18. The legs 14 and 17 are substantially parallel and I provide a hole or opening 19 through the block 10 inwardly from the edge 12 which will extend substantially parallel to the opening 11. Hole 19 is also threaded throughout its length.

A keeper designated 20 has a shank portion 21 threaded as at 22 to engage the threads of the hole 19. In the end portion of this shank 21 which moves toward the leg 17, there is provided a recess 23 which is threaded so as to threadingly engage the threads 18 on the leg 17 to lock therewith. The threads in the hole 19 and the threads 18 and 23 will be substantially the same pitch so that as the stud 21 is advanced by reason of its threads there will be a threaded locking engagement between the parts 18 and 23.

A handle 25 is provided on the other end of the keeper 20 which is enlarged sufficiently so that it may be easily manipulated by the fingers. A convenient form of handle may be a hexagonal head but any particular form which is desired may of course be used. The body 10 is notched as at 26 so that a portion of the keeper 20 may be accessible in this notched out corner of the body that more economy of space may be had.

In operation it is merely necessary to retract the keeper member 20 from the engaged position as shown in Figs. 1 and 3 to the retracted position shown in Fig. 2. The hasp 13 may be then rotated about the axis of the leg 14 to the position shown in Fig. 2 which will enable a key such as shown at 28 to be positioned thereon. Any number of keys may be assembled up to the capacity of the bridge 16 and then this hasp may be swung so as to cause substantial alignment of the leg 17 and the keeper 20. Rotation of the keeper by the handle 25 will then cause the keeper to advance through the opening 19 and to threadingly engage and lock with the threads 18 of the legs 17 so that the keys cannot escape from position.

By providing for a U-shape hasp which may rock about the axis of one of its legs in the body while providing in the body another part which may axially move to engage and lock with the other leg I provide a very simple key holder which is strong in construction, and may be easily operated, and is durable for long wear. Threads provide a simple form of assembly.

I claim:

1. A key holder comprising a block having a hole therethrough, a U-shape hasp having one leg threadedly received in said block and swingable to align the other leg with said hole, said other leg being threaded, and a keeper movable in said hole and provided with a threaded recess to threadingly engage the other leg of the hasp to lock it in position.

2. A key holder comprising a block having threaded openings therein, a U-shape hasp having one leg threadedly received in one of said openings in said block and swingable to align the other leg with the other of said openings, said other leg being threaded, and a keeper having a threaded portion movable in the said other of said openings and provided with a threaded recess to threadingly engage said other leg of the hasp and lock it in position.

VINCENT SORRENTINO.